(12) United States Patent
Fujita

(10) Patent No.: US 9,983,347 B2
(45) Date of Patent: May 29, 2018

(54) DISPLAY DEVICE

(71) Applicant: YAZAKI CORPORATION, Tokyo (JP)

(72) Inventor: Sunao Fujita, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 98 days.

(21) Appl. No.: 15/163,283

(22) Filed: May 24, 2016

(65) Prior Publication Data

US 2016/0347246 A1 Dec. 1, 2016

(30) Foreign Application Priority Data

Jun. 1, 2015 (JP) ................. 2015-111245

(51) Int. Cl.
*B60Q 1/00* (2006.01)
*F21V 8/00* (2006.01)
*B60Q 1/26* (2006.01)

(52) U.S. Cl.
CPC ............ *G02B 6/006* (2013.01); *B60Q 1/26* (2013.01); *G02B 6/0036* (2013.01)

(58) Field of Classification Search
CPC .............................................. B60Q 1/26–1/56
See application file for complete search history.

(56) References Cited

U.S. PATENT DOCUMENTS

| | | | | |
|---|---|---|---|---|
| 6,054,932 A * | 4/2000 | Gartner | ................. | G08G 1/095 340/815.45 |
| 8,248,265 B2 * | 8/2012 | Jones | .................... | H01H 9/182 340/427 |
| 8,299,980 B2 * | 10/2012 | Takahashi | .......... | G02B 27/2292 345/4 |
| 8,764,266 B2 * | 7/2014 | Urtiga | .................... | G09F 13/18 362/612 |
| 2006/0083476 A1 | 4/2006 | Winkler | | |
| 2007/0263137 A1 * | 11/2007 | Shigeta | ................ | G02B 6/0038 349/63 |
| 2010/0259485 A1 | 10/2010 | Chuang | | |

(Continued)

FOREIGN PATENT DOCUMENTS

JP 5-319138 A 12/1993
JP 2006-184881 A 7/2006

(Continued)

OTHER PUBLICATIONS

Japanese Office Action for the related Japanese Patent Application No. 2015-111245 dated Aug. 15, 2017.

*Primary Examiner* — Christle I Marshall
(74) *Attorney, Agent, or Firm* — Kenealy Vaidya LLP

(57) ABSTRACT

A display device includes a first display surface that emits light and displays vehicle information, and a second display surface that is placed on the first display surface in an overlapping manner, transmits the light emitted from the first display surface, and on which grooves that form a drawing pattern are created, wherein the grooves with a groove pitch are created so as to prevent diffracted light having visible light range components that is emitted from the first display surface and that is diffracted by the grooves from forming an image in an eye range determined in advance according to a vehicle.

9 Claims, 9 Drawing Sheets

(56) References Cited

U.S. PATENT DOCUMENTS

2011/0194167 A1* 8/2011 Jackson ................ G02B 27/01
                                                                   359/290
2016/0003990 A1* 1/2016 Tsukahara ............ B42D 25/328
                                                                   359/567

FOREIGN PATENT DOCUMENTS

| JP | 2012-32286 A  | 2/2012 |
| JP | 2013-137440 A | 7/2013 |

\* cited by examiner

FRONT SURFACE SIDE ←DEPTH DIRECTION→ REAR SURFACE SIDE

FRONT SURFACE SIDE ←DEPTH DIRECTION→ REAR SURFACE SIDE

DISPLAY DEVICE

CROSS-REFERENCE TO RELATED APPLICATION(S)

The present application claims priority to and incorporates by reference the entire contents of Japanese Patent Application No. 2015-111245 filed in Japan on Jun. 1, 2015.

BACKGROUND OF THE INVENTION

1. Field of the Invention

The present invention relates to a display device.

2. Description of the Related Art

As a conventional display device mounted on a vehicle and the like, for example, Japanese Patent Application Laid-open No. 2012-32286 discloses a display device that includes a first display unit that displays instruments of a vehicle and a second display unit that displays additional information. The second display unit of the display device is provided with a plurality of colorless and transparent light guide plates arranged on top of the front side of a scale plate of the first display unit in an overlapping manner, and a drawing pattern is formed on the light guide plates by a groove.

In such a display device, for example, a liquid crystal display or the like is sometimes used to display an image the same way as that of the first display unit, instead of using the first display unit disclosed in Japanese Patent Application Laid-open No. 2012-32286 described above, so as to display a wider variety of images. In such a case, in the display device, there is a possibility of generating a virtual image of an image displayed on the liquid crystal display, because the light from the liquid crystal display or the like is diffracted by the groove that forms the drawing pattern on the light guide plate. Thus, there is a possibility of reducing the visibility.

SUMMARY OF THE INVENTION

The present invention has been made in view of the above circumstances, and an object of the present invention is to provide a display device that can ensure appropriate visibility.

In order to achieve the above mentioned object, a display device according to one aspect of the present invention includes a first display surface that emits light and displays vehicle information; and a second display surface that is placed on the first display surface in an overlapping manner, transmits the light emitted from the first display surface, and on which grooves that form a drawing pattern are created, wherein the grooves with a groove pitch are created so as to prevent diffracted light having a visible light range component that is emitted from the first display surface and that is diffracted by the grooves from forming an image in an eye range determined in advance according to a vehicle.

In order to achieve the above mentioned object, a display device according to another aspect of the present invention includes a first display surface that emits light and displays an image related to vehicle information; and a second display surface that is placed on the first display surface in an overlapping manner, transmits the light emitted from the first display surface, and on which grooves that form a drawing pattern is created, wherein an incident surface of light to the first display surface and the second display surface, and an exit surface of light from the second display surface are parallel to each other, and the grooves extend in a horizontal direction and prevent diffracted light having a visible light range component that is emitted from the first display surface and that is diffracted by the grooves from forming an image within an angle range of 20 degrees with respect to a normal line of the first display surface in a vertical direction, based on an intersection between the first display surface and the normal line of the first display surface, by making a groove pitch equal to or more than zero and equal to or less than 0.5 µm.

According to still another aspect of the present invention, in the display device, it is possible to configure that the groove pitch is at a maximum within a range of a predetermined area in which the diffracted light having a visible light range component that is emitted from the first display surface and that is diffracted by the grooves does not form an image.

According to still another aspect of the present invention, in the display device, it is possible to configure that the first display surface displays the vehicle information by light polarized in a single direction, and the grooves extend in a direction intersecting with a polarization direction of the light being polarized.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention will now be described in detail below with reference to the accompanying drawings. It is to be understood that the present invention is not limited to the embodiment. Further, constituent elements in the following embodiment include those that can be easily replaced by a person skilled in the art, or those that are substantially the same.

Embodiment

Figure 1:
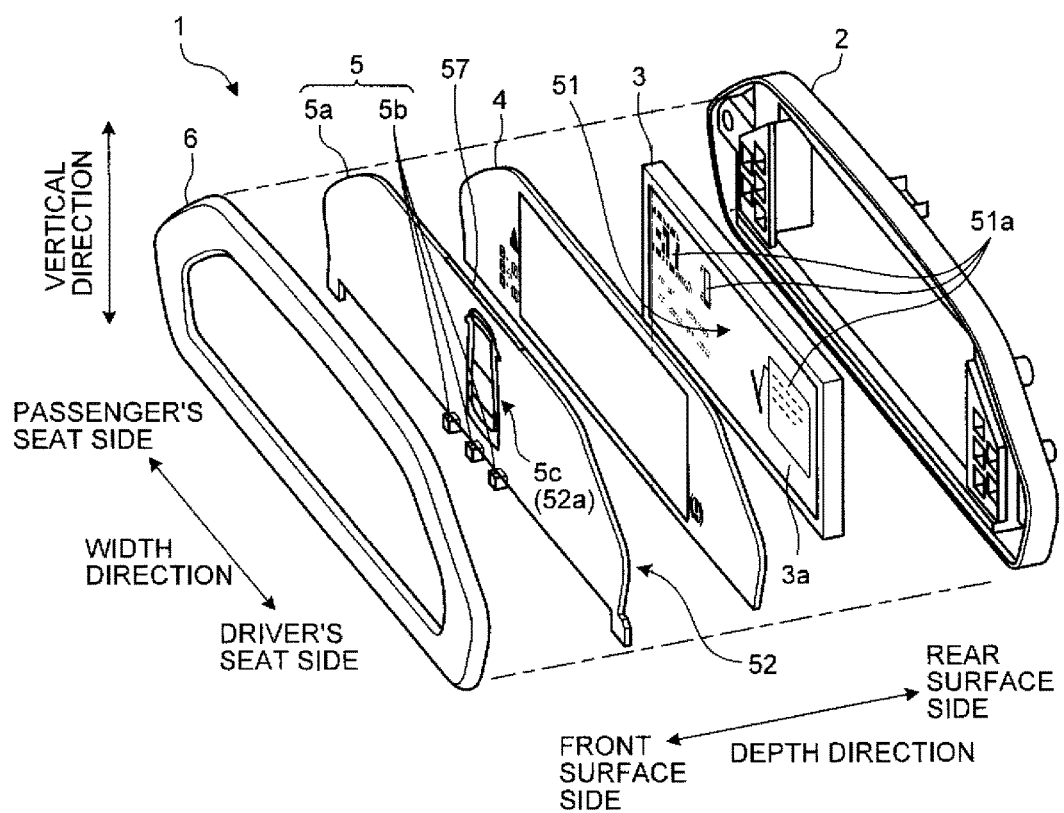
FIG. 1 is an exploded perspective view schematically illustrating a configuration of a display device according to an embodiment.
Figure 2:
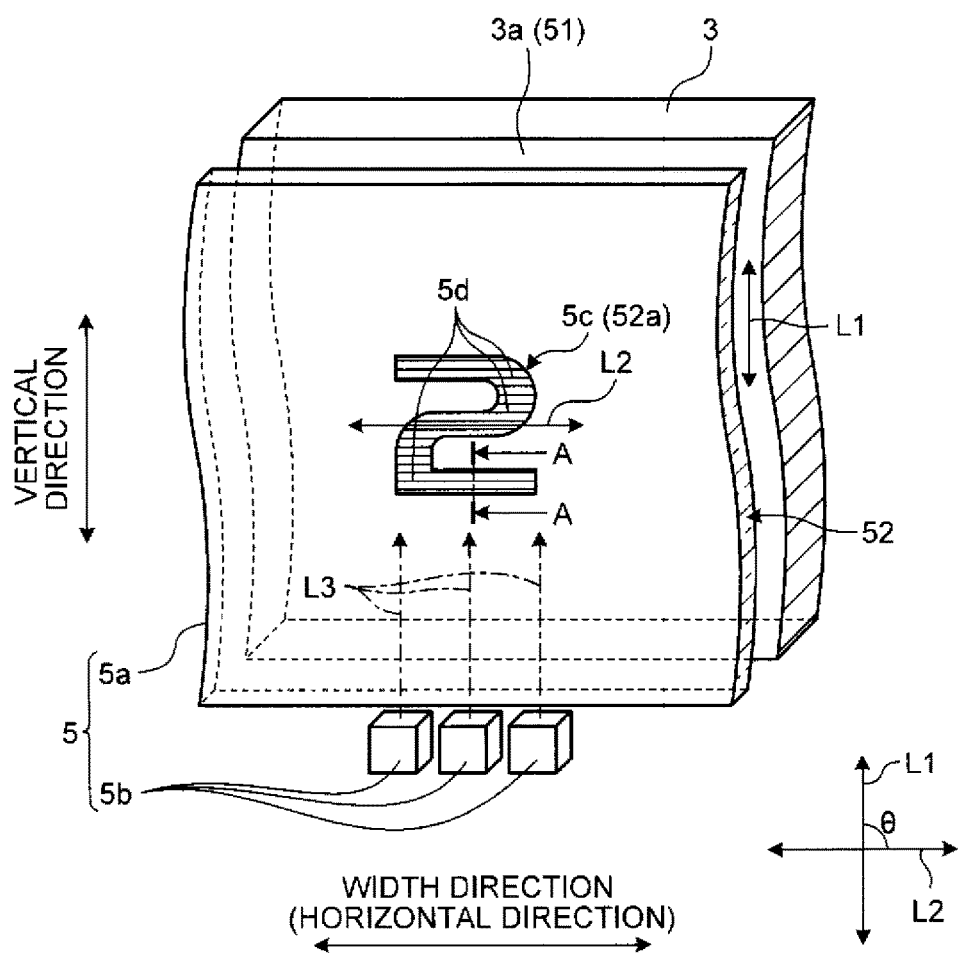
FIG. 2 is a perspective view schematically illustrating a configuration of a superimposing display device in the display device according to the embodiment.
Figure 3:
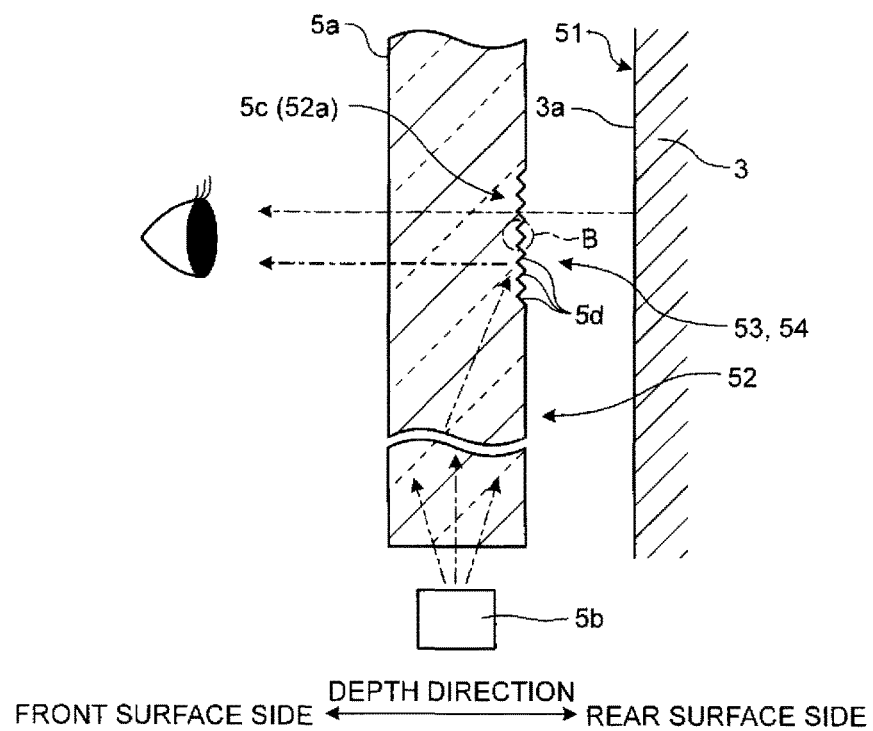
FIG. 3 is a schematic sectional view cut along line A-A in FIG. 2.
Figure 4:
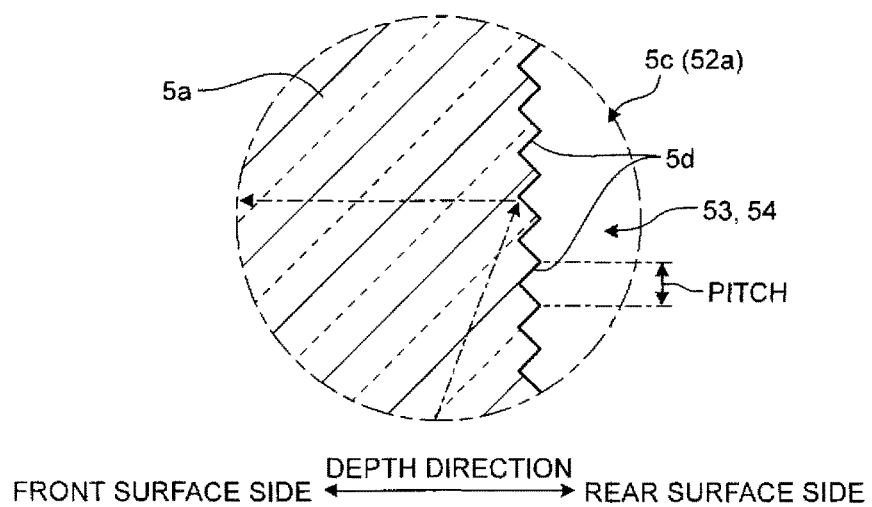
FIG. 4 is a partial sectional view inside an enclosure line B in FIG. 3.
Figure 5:
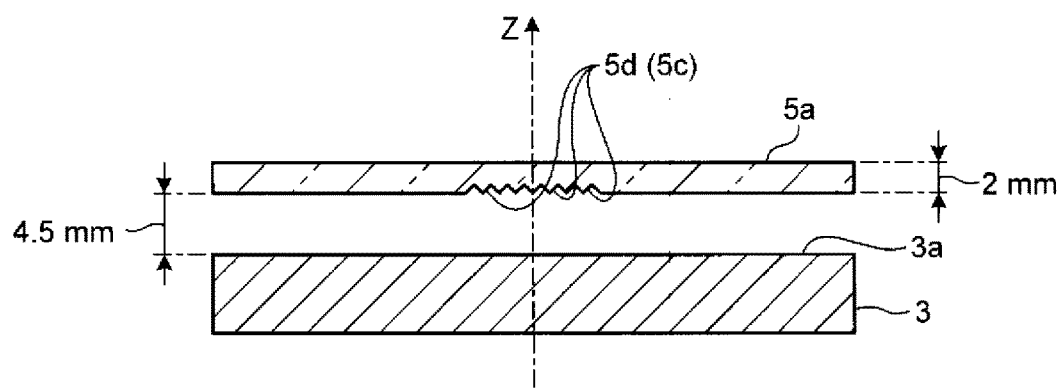
FIG. 5 is a schematic view for explaining the prerequisites of a luminance measurement test of the display device.
Figure 6:
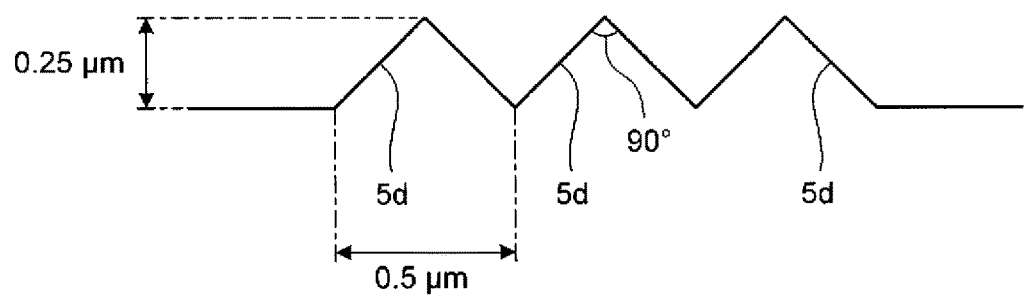
FIG. 6 is a schematic view for explaining the prerequisites of the luminance measurement test of the display device.
Figure 7:
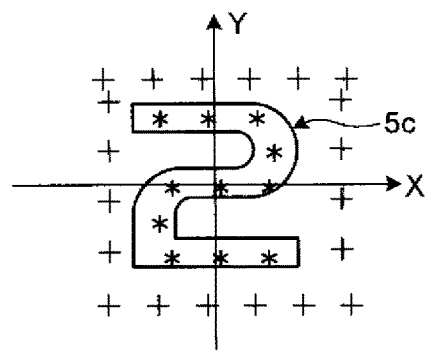
FIG. 7 is a schematic view for explaining the prerequisites of the luminance measurement test of the display device.
Figure 8:
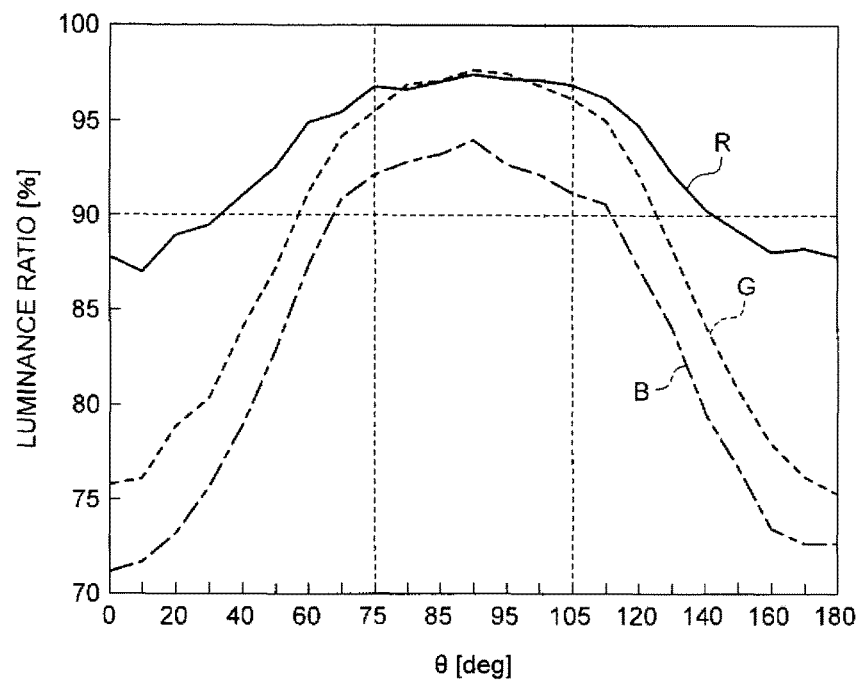
FIG. 8 is a diagrammatic view illustrating results of the luminance measurement test of the display device.
Figure 9:
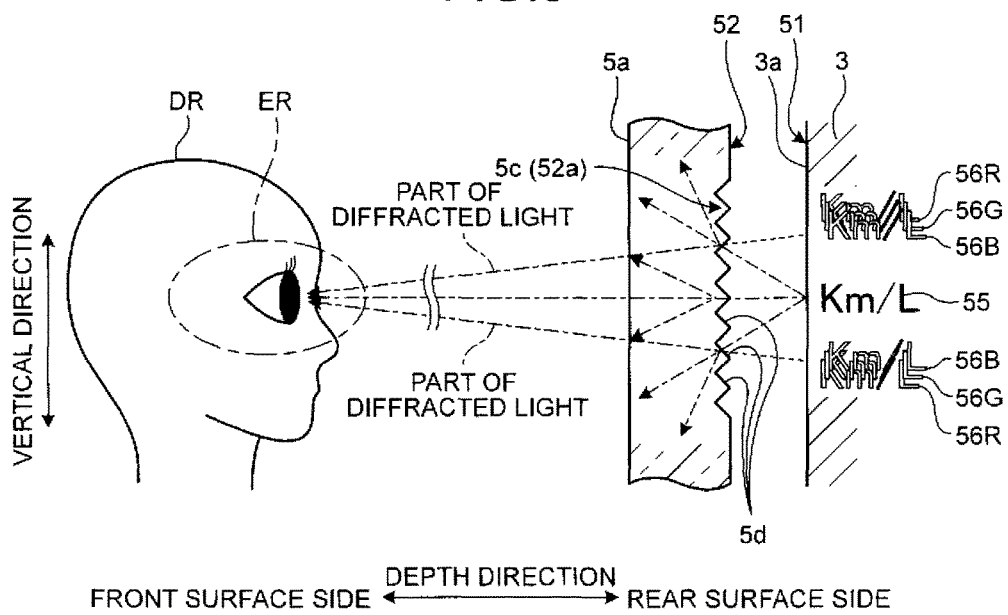
FIG. 9 is a schematic view for explaining a principle of generating a virtual image in the display device according to a comparative example.
Figure 10:
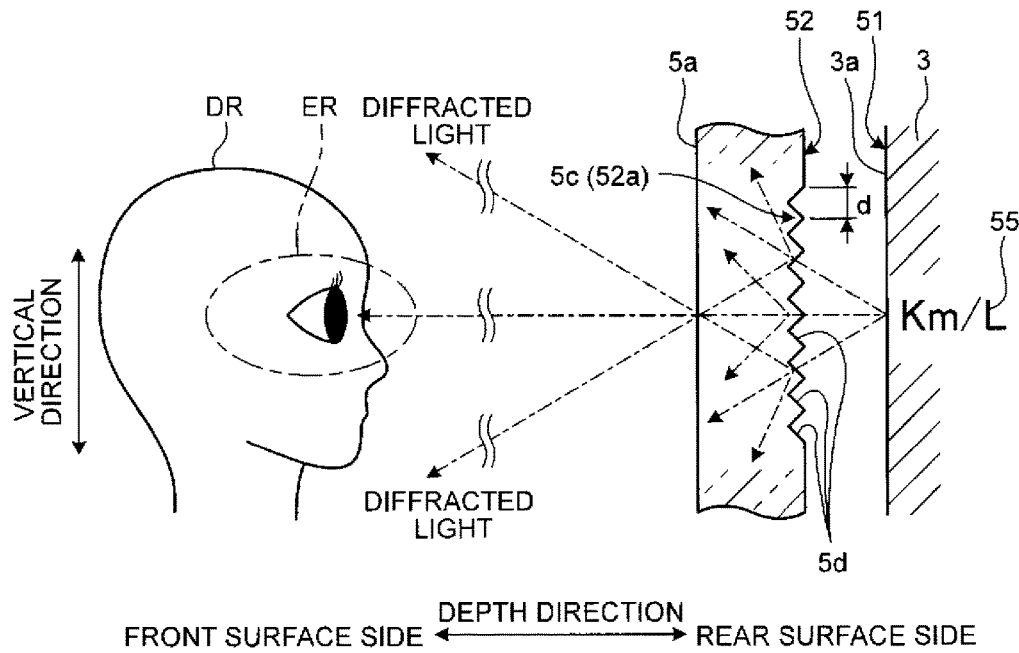
FIG. 10 is a schematic view for explaining a groove pitch in the display device according to the embodiment.
Figure 11:
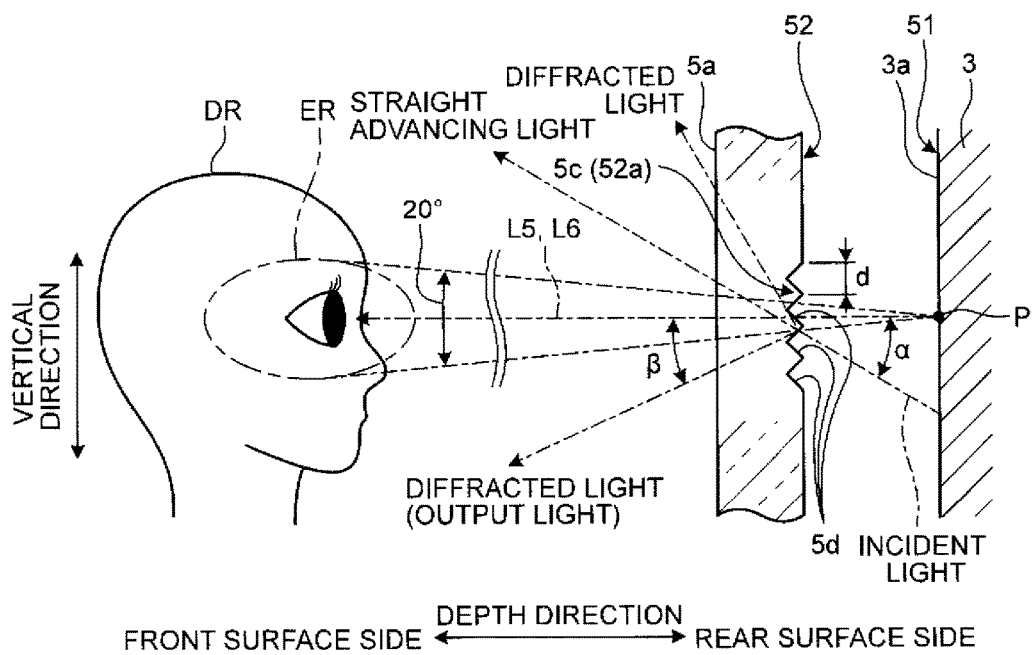
FIG. 11 is a schematic view for explaining a principle of preventing a virtual image from being viewed from a viewing position in an eye range with the display device according to the embodiment.
Figure 12:
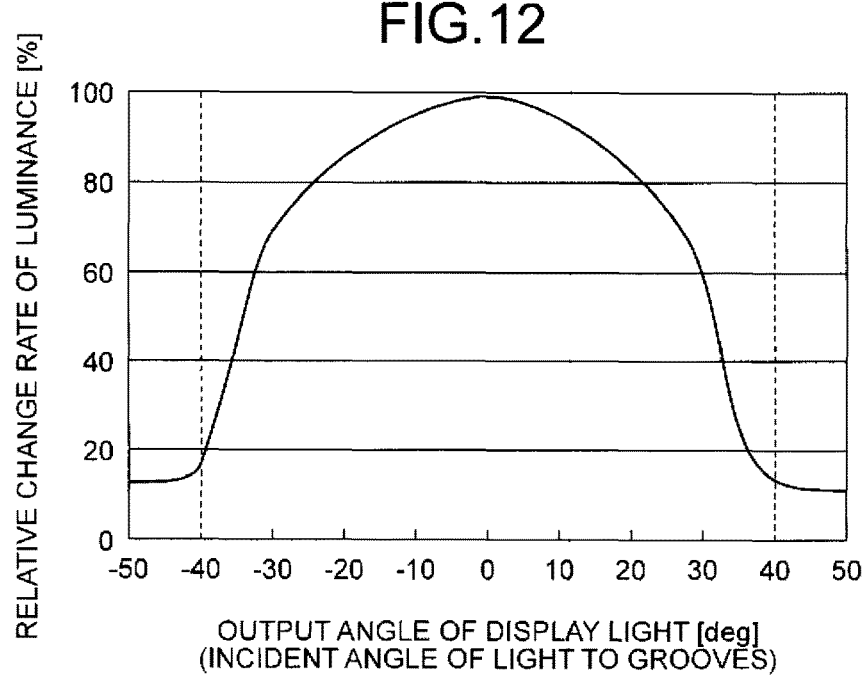
FIG. 12 is a diagrammatic view illustrating luminance distribution of a display in the display device according to the embodiment.
Figure 13:
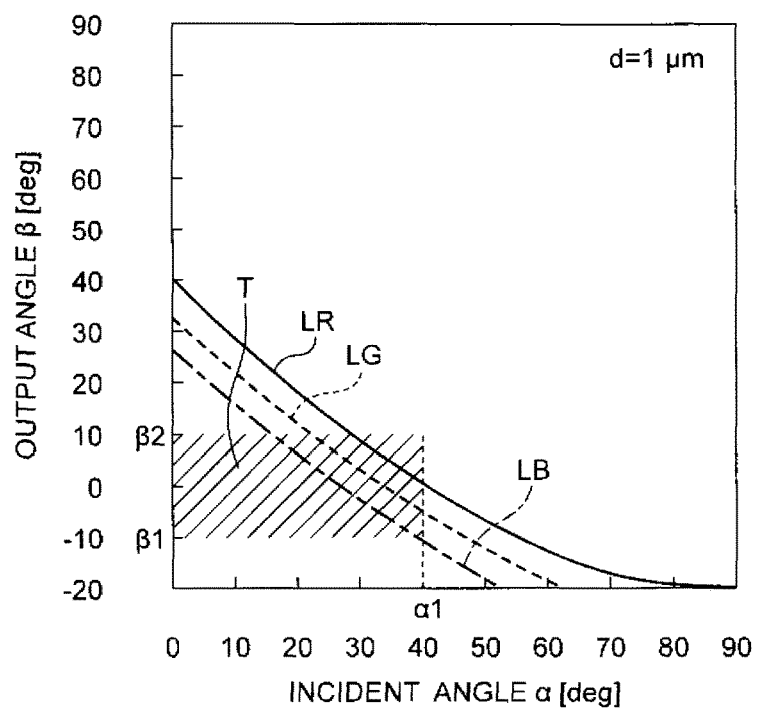
FIG. 13 is a diagrammatic view for determining whether an image is formed in an eye range ER, when the groove pitch is 1 µm.
Figure 14:
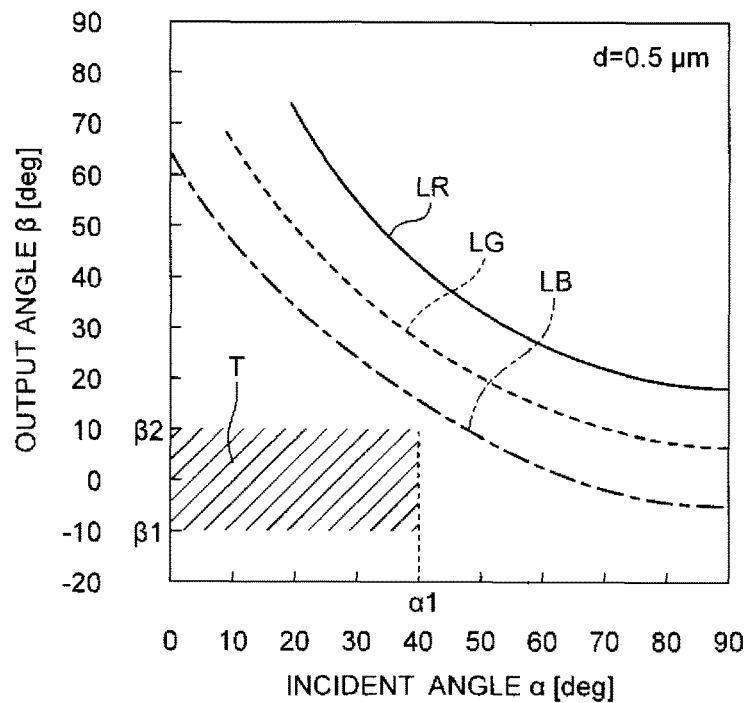
FIG. 14 is a diagrammatic view for determining whether an image is formed in the eye range ER, when the groove pitch is 0.5 μm.
Figure 15:
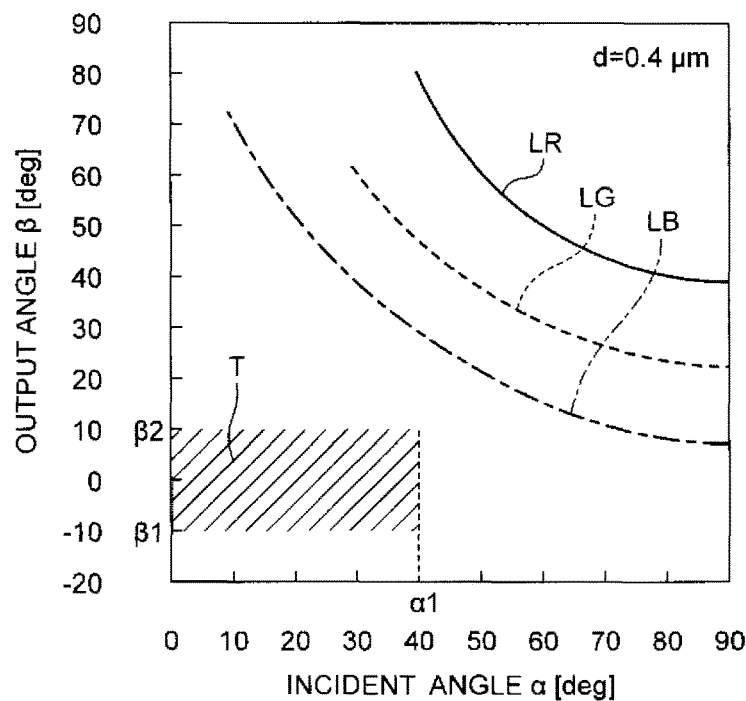
FIG. 15 is a diagrammatic view for determining whether an image is formed in the eye range ER, when the groove pitch is 0.4 μm.

FIG. 1 is an exploded perspective view schematically illustrating a configuration of a display device according to an embodiment. FIG. 2 is a perspective view schematically illustrating a configuration of a superimposing display device in the display device according to the embodiment. FIG. 3 is a schematic sectional view cut along line A-A in FIG. 2. FIG. 4 is a partial sectional view inside an enclosure line B in FIG. 3. FIG. 5, FIG. 6, and FIG. 7 are schematic views for explaining the prerequisites of a luminance measurement test of the display device. FIG. 8 is a diagrammatic view illustrating results of the luminance measurement test of the display device. FIG. 9 is a schematic view for explaining a principle of generating a virtual image in the display device according to a comparative example. FIG. 10 is a schematic view for explaining a groove pitch in the display device according to the embodiment. FIG. 11 is a schematic view for explaining a principle of preventing a virtual image from being viewed from a viewing position in an eye range with the display device according to the embodiment. FIG. 12 is a diagrammatic view illustrating luminance distribution of a display in the display device according to the embodiment. FIG. 13 is a diagrammatic view for determining whether an image is formed in the eye range, when the groove pitch is 1 μm. FIG. 14 is a diagrammatic view for determining whether an image is formed in the eye range, when the groove pitch is 0.5 μm. FIG. 15 is a diagrammatic view for determining whether an image is formed in the eye range, when the groove pitch is 0.4 μm.

As illustrated in FIG. 1, a display device 1 according to the present embodiment configures what is called a meter. For example, the display device 1 is mounted on an instrument panel provided on a dashboard of a vehicle such as an automobile, and displays various types of information for driving the vehicle. The width direction of the display device 1 illustrated in FIG. 1 typically corresponds to the vehicle width direction of a vehicle to which the display device 1 is applied. In the width direction of the display device 1, one side facing the front surface of the display device 1 (near side in FIG. 1) corresponds to a driver's seat side of the vehicle. The other side facing the front surface of the display device 1 (far side in FIG. 1) corresponds to a passenger's seat side of the vehicle. However, these may be reversed. The depth direction of the display device 1 illustrated in FIG. 1 typically corresponds to the longitudinal direction of the vehicle (in other words, the traveling direction of the vehicle) to which the display device 1 is applied. Also, the front surface side of the display device 1 is the side facing the driver's seat of the vehicle, and is typically, the side visually recognized by the driver seated in the driver's seat. On the other hand, the rear surface side of the display device 1 is opposite from the front surface side in the depth direction, and is typically, the side housed in the instrument panel.

More specifically, the display device 1 includes a casing 2, a display 3 as an image display device, a dial plate 4, a superimposing display device 5, and a facing plate 6. The display device 1 has a structure in which the casing 2, the display 3, the dial plate 4, the superimposing display device 5, and the facing plate 6 are layered in this order from the rear surface side toward the front surface side in the depth direction.

The casing 2 is a case in which various components that configure the display device 1 are assembled, and that houses these components.

The display 3 is driven and controlled via a control device and the like, and displays various images on an image display surface 3a. For example, the display 3 may be a thin liquid crystal display. However, it is not limited thereto, and the display 3 may also be a plasma display, an organic electroluminescence (EL) display, and the like. For example, an image to be displayed on the image display surface 3a may include information related to the speed of the vehicle and eco-driving. The image to be displayed on the image display surface 3a may also include various types of information related to driving that change constantly while the vehicle is being driven such as accumulated mileage, cooling water temperature, output rotational speed of a drive power source, remaining amount of fuel, and battery charge amount.

The dial plate 4 is a plate-like member with various symbols, characters, figures, and the like corresponding to various warning lamps (what is called telltales), a shift position indicator, a direction indication mark, and the like. Light is emitted toward the dial plate 4 from the rear surface side, and when the emitted light transmits through the portions with the symbols, the characters, the figures, and the like, those symbols, characters, figures, and the like are lit and displayed.

The surface on the front surface side of the display 3 described above is exposed from the dial plate 4, and the surface on the front surface side of the display 3 configures the image display surface 3a. The image display surface 3a configures a first display surface 51 that displays real images (images) 51a related to vehicle information. The vehicle information includes various types of information related to driving such as a vehicle state and a traveling state of a vehicle on which the display device 1 is mounted. The first display surface 51 presents the information to the driver and the like, by displaying the information as the real images 51a. The first display surface 51 can display the real images 51a in the ON state, and the real images 51a are not displayed in the OFF state.

The superimposing display device 5, as illustrated in FIG. 1, FIG. 2, FIG. 3, and FIG. 4, includes a transparent light guide plate 5a and light sources 5b. The transparent light guide plate 5a is placed on top of the front surface side of the image display surface 3a in an overlapping manner. The transparent light guide plate 5a is formed of a transparent member (transparent medium) having transparency and that transmits the light emitted from the display 3. Fine grooves 5d that form a drawing pattern (display design) 5c are created on the transparent light guide plate 5a. For example, the grooves 5d that form the drawing pattern 5c may be created on the principle surface of the transparent light guide plate 5a, in this case, on the principle surface at the rear surface side of the transparent light guide plate 5a in a concave shape. This may be possible by resin-molding the transparent light guide plate 5a, by using a molding die having a convex-shaped portion corresponding to the grooves 5d. For example, the grooves 5d that form the drawing pattern 5c may be engraved on the principle surface of the transparent light guide plate 5a, in this case, on the principle surface at the rear surface side of the transparent light guide plate 5a, in a concave shape, using various methods such as laser machining. For example, the drawing pattern 5c formed on the transparent light guide plate 5a by the grooves 5d may include various drawing patterns corresponding to the driving information displayed on the display 3. In the example in FIG. 1, for example, the drawing pattern 5c is a "vehicle symbol (icon) shaped like a vehicle". In the example in FIG. 2 and the like, for example, the drawing pattern 5c is a numeral "2". However, it is not limited thereto. The light sources 5b irradiate the end surface of the transparent light guide plate 5a with light. For example, each of the light sources 5b is configured with a light emitting diode (LED) element and the like. However, it is not limited thereto. The light sources 5b each are provided so that the axis direction thereof is orthogonal to the end surface of the transparent light guide plate 5a, and the emitted light enters from the end surface of the transparent light guide plate 5a. The extending direction of the grooves 5d, the irradiation direction of the light from the light sources 5b, and the like will be described in detail below.

The superimposing display device 5 can switch the display state and non-display state of the drawing pattern 5c by turning on and turning off the light sources 5b, because the light sources 5b are driven and controlled via the control device and the like. In the superimposing display device 5, the drawing pattern 5c is displayed when the light sources 5b are turned on. In other words, the light emitted from the light sources 5b enters the end surface of the transparent light guide plate 5a, and propagates through the transparent light guide plate 5a. Then, at least a part of the components of the incident light is reflected by the grooves 5d that form the drawing pattern 5c to the front surface side. As a result, the driver and the like can visually recognize the drawing pattern 5c (see FIG. 3, FIG. 4, and the like). In this case, in the superimposing display device 5, when the driver looks from the front surface side (driver's seat side), a predetermined design is formed by superimposing the drawing pattern 5c displayed on the transparent light guide plate 5a with an image on the image display surface 3a of the display 3, which is placed at the rear surface side of the transparent light guide plate 5a, to be displayed. Thus, it is possible to display a wide variety of images. In the superimposing display device 5, the drawing pattern 5c is not displayed when the light sources 5b are turned off. Hence, the light emitted from the display 3 and that transmits through the transparent light guide plate 5a enables the driver and the like to easily visually recognize various images displayed on the image display surface 3a.

The principle surface at the rear surface side of the transparent light guide plate 5a, on which the grooves 5d are created as above, configures a second display surface 52. The second display surface 52 is placed on top of the first display surface 51 in an overlapping manner, transmits light, and can switch the display state and non-display state with the first display surface 51 being in ON state, during which the first display surface 51 can display the real images 51a. The display state of the second display surface 52 is a state when the light emitted from the light sources 5b displays a real image drawing pattern 52a. The real image drawing pattern 52a is the drawing pattern 5c described above, and in this case, for example, is the "vehicle symbol (icon) shaped like a vehicle" described above, in other words, a symbol of the vehicle and the like. The non-display state of the second display surface 52 is a state when the real image drawing patterns 52a are not displayed when the light sources 5b are turned off.

The first display surface 51 and the second display surface 52 configure a plurality of display surfaces overlapped in the depth direction, in other words, in the traveling direction of the vehicle. The first display surface 51 configures the display surface at the far side among the display surfaces in the traveling direction of the vehicle. The second display surface 52 configures the display surface at the near side among the display surfaces in the traveling direction of the vehicle (the side of the viewing position of a viewer such as the driver).

The facing plate 6 is a frame-shaped member that holds the dial plate 4, the transparent light guide plate 5a, and the like, by enclosing the periphery of the dial plate 4, the transparent light guide plate 5a, and the like.

In the display device 1 of the present embodiment, the polarization direction of the display 3 and the extending direction of each of the grooves 5d that form the drawing pattern 5c (real image drawing pattern 52a) intersect with each other in a predetermined angle range. Thus, a wide variety of images can be displayed by combining the display 3 and the superimposing display device 5. It is also possible to ensure appropriate visibility. The polarization direction of the display 3 typically corresponds to the final transmission axis direction in the display 3, and the extending direction of the grooves 5d typically corresponds to the direction toward which the grooves 5d extends.

In the display 3 of the present embodiment, real images 51a (image) are displayed by emitting the light polarized in a single direction. In other words, when the light emitted from a backlight is aligned in a polarization direction L1 (see FIG. 2 and the like) as the transmission axis direction via a polarization plate and the like, the display 3 outputs the light polarized in a single direction by outputting the light in the vibration direction along the polarization direction L1 (transmission axis direction). In the display 3, the front surface of the final polarization plate typically configures the surface of the image display surface 3a described above, and the transparent light guide plate 5a is arranged at the front surface side of the polarization plate. The light in the vibration direction along the polarization direction L1 (transmission axis direction) then enters the transparent light guide plate 5a. The polarization direction L1 is the direction along the vertical direction. Hereinafter, the final polarization direction of the display 3 may be referred to as the "polarization direction L1".

For example, the grooves 5d that form the drawing pattern (display design) 5c, as illustrated in FIG. 4 and the like, preferably have a V-shaped cross section and a pitch of equal to or less than 1 μm (the minimum value corresponds to the producible size, for example). Each of the grooves 5d is a straight groove extending in a single direction. The transparent light guide plate 5a is configured so that the transmittance of the material of the area of the drawing pattern 5c on the transparent light guide plate 5a is the same as that of the material of the area around the drawing pattern 5c on the transparent light guide plate 5a. The diffraction efficiency of a diffraction grating formed with such fine grooves 5d tends to be different between when the vibration direction of light is perpendicular (orthogonal) to the extending direction (see an arrow L2 in FIG. 2 and the like) of the grooves 5d and when the vibration direction of light is parallel to the extending direction. In other words, the diffraction grating formed with such fine grooves 5d typically tends to transmit the light the vibration direction of which is perpendicular to an extending direction L2 of the grooves 5d, and block the light the vibration direction of which is parallel to the extending direction L2 of the grooves 5d. In other words, the fine grooves 5d created on the transparent light guide plate 5a have a similar effect as that of the polarization plate. If the direction orthogonal to the extending direction L2 of the grooves 5d is the transmission axis direction, the grooves 5d transmit the light that vibrates in the transmission axis direction, and block most of the light that vibrates in the absorption axis direction (extending direction L2 of the grooves 5d) orthogonal to the transmission axis direction.

In the display device 1 of the present embodiment, the polarization direction L1 of the display 3 and the extending direction L2 of the grooves 5d that form the drawing pattern 5c intersect with each other in an angle range from equal to or more than 75 degrees to equal to or less than 105 degrees. If an angle formed by the polarization direction (transmission axis direction) L1 of the display 3 and the extending direction L2 of the grooves 5d that form the drawing pattern 5c is an angle θ (see FIG. 2), the grooves 5d are created on the transparent light guide plate 5a so that the angle θ satisfies the conditional expression of [75°≤θ≤105° ]. In other words, the polarization direction L1 and the extending direction L2 intersect with each other at a predetermined angle θ in the range from equal to or more than 75 degrees to equal to or less than 105 degrees. More preferably, the polarization direction L1 and the extending direction L2 intersect with each other at a predetermined angle θ in the range from equal to or more than 85 degrees to equal to or less than 95 degrees. Most preferably, the polarization direction L1 of the display 3 and the extending direction L2 of the grooves 5d that form the drawing pattern 5c are orthogonal to each other. The grooves 5d are created on the transparent light guide plate 5a, so that the extending direction L2 of the grooves 5d and the polarization direction L1 of the display 3 are orthogonal to each other, and the transmission axis direction of the diffraction grating formed by the fine grooves 5d and the polarization direction L1 are parallel to each other. If the polarization direction L1 of the display 3 and the extending direction L2 of the grooves 5d are orthogonal to each other, it is θ=90 degrees. In addition to this, for example, an error is allowed in a range of an allowable error angle α according to the tolerance, which is allowed in the manufacturing process of the display device 1.

In the display device 1 configured as the above, the polarization direction L1 of the display 3 and the extending direction L2 of the grooves 5d are orthogonal to each other (θ=90'). In other words, the polarization direction L1 of the display 3 and the transmission axis direction of the grooves 5d are parallel to each other. Thus, in the display device 1, in the non-display state when the light sources 5b are turned off, almost all the light from the display 3 is transmitted in the area inside the drawing pattern 5c, same as the area outside the drawing pattern 5c. As a result, in the display device 1, a luminance ratio that indicates the ratio of the luminance of the area of the drawing pattern 5c relative to the luminance of the area around the drawing pattern 5c on the transparent light guide plate 5a (hereinafter, may be simply referred to as a "luminance ratio of the area of the drawing pattern 5c relative to the area around the drawing pattern 5c") is at a maximum in the state when the light sources 5b are turned off. Thus, the area of the drawing pattern 5c is inconspicuous relative to the area around the drawing pattern 5c, and it is possible to make the drawing pattern 5c difficult to visually recognize. The luminance ratio of the area of the drawing pattern 5c relative to the area around the drawing pattern 5c can be typically indicated by "luminance of the area of the drawing pattern 5c/luminance of the area around the drawing pattern 5c×100[%]". The luminance difference between the area around the drawing pattern 5c and the area of the drawing pattern 5c becomes relatively large, as the luminance ratio decreases.

In the display device 1, the state that the drawing pattern 5c is difficult to visually recognize can be maintained, not only when the polarization direction L1 and the extending direction L2 are orthogonal to each other (θ=90°), but also when it is in the range of [75°≤θ≤105° ] as described above, and more preferably, when it is in the range of [85°≤θ≤95° ]. This is because the luminance ratio of the area of the drawing pattern 5c relative to the area around the drawing pattern 5c is within a predetermined luminance ratio range. The predetermined luminance ratio range, for example, is the range from equal to or more than 90% to equal to or less than 100%, and more preferably, from equal to or more than 92.5% to equal to or less than 100%. As described above, in the display device 1, the polarization direction L1 of the display 3 and the extending direction L2 of the grooves 5d intersect with each other in the angle range as described above. Thus, the polarization direction L1 and the extending direction L2 may be configured so as to intersect with each other in an angle range in which the luminance ratio of the luminance of the area of the drawing pattern 5c relative to the luminance of the area around the drawing pattern 5c is equal to or more than 90% and equal to or less than 100%.

A luminance measurement test of the display device 1 will now be described with reference to FIGS. 5 to 8. The display device 1 according to the embodiment described above is used to perform the luminance measurement test, and a luminance measuring camera is used to measure the luminance on the transparent light guide plate 5a. In the display device 1, the display 3, the transparent light guide plate 5a, and the like are arranged as illustrated in FIG. 5, and the grooves 5d are formed into the shape as illustrated in FIG. 6. In other words, in the display device 1, the thickness of the transparent light guide plate 5a in the depth direction is 2 mm, and the interval between the image display surface (surface) 3a of the display 3 and the back surface (rear surface) of the transparent light guide plate 5a in the depth direction is 4.5 mm. In the display device 1, the grooves 5d that form the drawing pattern 5c are created on the rear surface of the transparent light guide plate 5a. In the present luminance measurement test, the luminance measurement position relative to the Z direction (depth direction) is the position on the surface of the transparent light guide plate 5a on which the grooves 5d are created, and corresponds to the focal position of the luminance measuring camera. In the display device 1, the grooves 5d have a substantially V-shaped cross section, and the pitch thereof is 0.5 μm. The depth of each of the grooves 5d in the depth direction is 0.25 μm, and the angle formed by the bottom is substantially 90 degrees (deg). In the display device 1, each of the grooves 5d is a straight groove extending in a single direction. In the present luminance measurement test, as illustrated in FIG. 7, the luminance measurement positions relative to the X direction (width direction) and the Y direction (perpendicular direction) are respectively obtained by selecting a plurality of positions in the area of the drawing pattern 5c and the area around the drawing pattern 5c, and the average value thereof is used. The luminance measurement test was carried out for each light source color of the display 3, by using the red light at X=0.63 and Y=0.35, the green light at X=0.31 and Y=0.58, and the blue light at X=0.14 and Y=0.05 on the chromaticity diagram. In the present luminance measurement test, the luminance is measured from the luminance measurement position described above using the luminance measuring camera, when the light sources 5b are turned off, and by changing the angle θ formed by the polarization direction L1 and the extending direction L2, by relatively rotating the transparent light guide plate 5a relative to the image display surface 3a.

FIG. 8 illustrates the results of the luminance measurement test described above. In FIG. 8, the horizontal axis is the angle θ [deg] formed by the polarization direction L1 and the extending direction L2, and the vertical axis is the luminance ratio [%] of the luminance of the area of the drawing pattern 5c relative to the luminance of the area around the drawing pattern 5c. As is obvious from FIG. 8, in the display device 1, when the angle θ formed by the polarization direction L1 and the extending direction L2 is in the range of [75°≤θ≤105°], the luminance ratio of the area of the drawing pattern 5c relative to the area around the drawing pattern 5c is equal to or more than 90% and equal to or less than 100%, for all three colors of red (see line R), green (see line G), and blue (see line B). Thus, it is obvious that the grooves 5d that form the drawing pattern 5c on the transparent light guide plate 5a are difficult to visually recognize, when the drawing pattern 5c is not displayed. Further, in the display device 1, when the angle θ is in the range of [85°≤θ≤95°], the luminance ratio of the area of the drawing pattern 5c relative to the area around the drawing pattern 5c is equal to or more than 92.5% and equal to or less than 100%, for all three colors of red, green, and blue. Thus, it is obvious that the grooves 5d are more difficult to visually recognize. In the display device 1, when the angle θ is [θ=90°], in other words, when the polarization direction L1 and the extending direction L2 are orthogonal to each other, the luminance ratio of the area of the drawing pattern 5c relative to the area around the drawing pattern 5c is at a maximum, for all three colors of red, green, and blue. Thus, it is obvious that the grooves 5d are most difficult to visually recognize. In the display device 1, when the angle θ is [θ=90°], the luminance ratio was 97.4% when the red light is emitted, the luminance ratio was 97.6% when the green light is emitted, and the luminance ratio was 94% when the blue light is emitted.

Furthermore, in the display device 1 of the present embodiment, as illustrated in FIG. 2 and the like, the extending direction L2 of the grooves 5d and an irradiation direction L3 of the light from the light sources 5b of the superimposing display device 5 are orthogonal to each other. In other words, in this case, the polarization direction L1 of the display 3 and the irradiation direction L3 of the light from the light sources 5b are in the vertical direction, and the extending direction L2 of the grooves 5d is in the horizontal direction. Hence, in the display device 1, the light from the light sources 5b can enter the grooves 5d that form the drawing pattern 5c in a substantially perpendicular manner. Consequently, to display the drawing pattern 5c on the transparent light guide plate 5a, it is possible to relatively increase the amount of light reflected by the grooves 5d to the front surface side (driver's seat side). Thus, it is possible to clearly display the drawing pattern 5c. The length of the transparent light guide plate 5a of the present embodiment is longer in the horizontal direction than that in the vertical direction, and the light sources 5b are arranged vertically below or vertically above the transparent light guide plate 5a. In the present embodiment, three of the light sources 5b are provided at a regular interval along the width direction (horizontal direction), at a position vertically below the area where the drawing pattern 5c is formed and that faces the end surface vertically below the transparent light guide plate 5a. Each of the light sources 5b emits light vertically upward. For example, each of light sources 5b is arranged at a position hidden by the facing plate 6 when viewed from the front surface side.

On the second display surface 52, as illustrated in FIG. 3, FIG. 4, and the like, a display structure 53 and a non-display structure 54 of the real image drawing pattern 52a (drawing pattern 5c) are configured, by creating the fine grooves 5d on the principle surface at the rear surface side of the transparent light guide plate 5a, so that the polarization direction L1, the extending direction L2, the irradiation direction L3, and the like have such a positional relation as described above.

The display structure 53 of the second display surface 52 is a structure that forms the real image drawing pattern 52a (drawing pattern 5c) with the light emitted from the light sources 5b when the second display surface 52 is in the display state. Here, the display structure 53 is a structure that forms the real image drawing pattern 52a, by reflecting the light emitted from the light sources 5b by the fine grooves 5d created on the surface of the transparent light guide plate 5a, which is a member of the second display surface 52, when the second display surface 52 is in the display state. Thus, the display structure 53 allows the driver and the like to visually recognize the real image drawing pattern 52a on the second display surface 52.

On the other hand, the non-display structure 54 of the second display surface 52 is a structure that makes the real image drawing pattern 52a difficult to visually recognize, when the second display surface 52 is in the non-display state, compared to that in the display state. Further, the non-display structure 54 of the second display surface 52 is a structure that makes the fine grooves 5d difficult to visually recognize, when the second display surface 52 is in the non-display state, compared to that in the display state. The non-display structure 54 makes the real image drawing pattern 52a difficult to visually recognize, by turning off the light sources 5b. Furthermore, the non-display structure 54 is a structure that makes the grooves 5d difficult to visually recognize, by forming the grooves 5d so that the polarization direction L1 of the display 3 and the extending direction L2 of the grooves 5d that form the real image drawing pattern 52a (drawing pattern 5c) intersect with each other in a predetermined angle range, typically, in the angle range from equal to or more than 75 degrees to equal to or less than 105 degrees as described above. Thus, the non-display structure 54 can make the amplitude of the transmission light substantially equal between the area of the real image drawing pattern 52a and the area around the real image drawing pattern 52a on the second display surface 52. Hence, the luminance difference between the area of the real image drawing pattern 52a and the area around the real image drawing pattern 52a is minimal. As a result, in the non-display state, the non-display structure 54 can make the real image drawing pattern 52a and the fine grooves 5d that form the real image drawing pattern 52a difficult to visually recognize.

In the display device 1 described above, there is a problem in that a virtual image of an image displayed on the first display surface 51 is generated, when the light output from the first display surface 51 of the display 3 is diffracted by the fine grooves 5d that form the real image drawing pattern 52a on the second display surface 52.

For example, as illustrated in a display device according to a comparative example in FIG. 9, a virtual image of an image displayed on the first display surface 51 is visually recognized from the viewing position in an eye range ER. This is because the diffracted light having visible light range components that is output from the first display surface 51 and that is diffracted by the fine grooves that form the real image drawing pattern 52a forms an image in the eye range ER, which is determined in advance according to a vehicle. The eye range ER is an "eye range of the driver of an automobile", and corresponds to an area where the viewpoint of a driver DR, which is determined in advance according to a vehicle, is placed. Typically, the eye range ER statistically indicates the distribution of the eye positions of the driver DR in the vehicle, and for example, corresponds to an area including the eye position of the driver DR at a predetermined ratio (such as 95%), while the driver DR is seated in the driver's seat. The virtual image of an image displayed on the first display surface 51 appears at different positions according to the wavelength of light.

For example, in FIG. 9, an image 55 is a real image of an image displayed on the first display surface 51. However, an image 56R is a virtual image formed by the red light of the diffracted light, an image 56G is a virtual image formed by the green light of the diffracted light, and an image 56B is a virtual image formed by the blue light of the diffracted light. As described above, in the display device according to the comparative example, there is a problem in that a virtual image of the real images 51a displayed on the first display surface 51 may be visually recognized from the viewing position in the eye range ER. Thus, there is a possibility of reducing the visibility.

However, in the display device 1 of the present embodiment, as illustrated in FIG. 10, the fine grooves 5d with a groove pitch d are created so as to prevent the diffracted light having visible light range components that is output from the first display surface 51 and that is diffracted by the grooves 5d from forming an image in the eye range ER. Thus, the display device 1 can prevent a virtual image from being visually recognized from the viewing position in the eye range ER, and ensures appropriate visibility of the real image (image 55) of an image displayed on the first display surface 51. The visible light range components are wavelength components that can be visually recognized by a human being, and for example, the wavelengths of the components are from 360 nm to 830 nm. Hereinafter, with reference to FIG. 11, FIG. 12, FIG. 13, FIG. 14, and FIG. 15, a principle of preventing a virtual image from being viewed from the viewing position in the eye range ER with the display device 1 of the present embodiment will be described.

A specific example will now be described with reference to FIG. 11. In the specific example illustrated in FIG. 11, an incident surface of the light to the first display surface 51 and the second display surface 52, and an exit surface of the light from the second display surface 52 are parallel to each other, and the grooves 5d extend in the horizontal direction as described above. Thus, in this case, a normal line L5 of the first display surface 51 coincides with a normal line L6 of the incident surface of the light to the second display surface 52 and the exit surface of the light from the second display surface 52. The incident light to the grooves 5d is diffracted by the grooves 5d, which extend along the horizontal direction, in the vertical direction. Consequently, whether the diffracted light forms an image by the grooves 5d may be determined, by determining whether an image is formed in a predetermined angle range along the vertical direction, as the eye range ER. It is assumed that the eye range ER is an angle range of 20 degrees (angle range of 10 degrees above and below the normal line L5) with respect to the normal line L5 of the first display surface 51 in the vertical direction, based on an intersection P of the first display surface 51 and the normal line L5 of the first display surface 51, corresponding to the geometric position and the like of the position of the display device 1 mounted on a vehicle and the driver's seat.

As illustrated in FIG. 11, where "α" is an incident angle of the incident light to the second display surface 52 on which the fine grooves 5d are created, in other words, the incident light to the grooves 5d (angle formed by the normal line L6 of the second display surface 52 and the incident light); "β" is an output angle of the output light from the second display surface 52, in other words, the diffracted light generated by the grooves 5d (angle formed by the normal line L6 of the second display surface 52 and the output light); and "d" is the groove pitch of the fine grooves 5d in the vertical direction, a relational expression of the diffraction, for example, can be given by the following formula (1). In the formula (1), "λ" is a wavelength of the light, and "m" is a degree (m=±0, 1, 2, . . . ).

$$d(\sin \alpha \pm \sin \beta) = m\lambda \quad (1)$$

The luminance of the light output from the first display surface 51 of the display 3, as illustrated in FIG. 12, tends to reduce significantly, at angles outside the specified angle range. In FIG. 12, the horizontal axis is the output angle of the display light (angle formed by the normal line L5 and the output light) [deg], and the vertical axis is the relative change rate of luminance (=(luminance at the output angle/maximum luminance)×100) [%]. The normal line L5 of the first display surface 51 coincides with the normal line L6 of the incident surface and the exit surface of the second display surface 52. Because the angle formed by the normal line L5 and the normal line L6 is zero, the output angle of the display light is equal to the incident angle α of the incident light to the grooves 5d.

As is obvious from FIG. 12, the luminance of the light output from the first display surface 51 of the display 3 is at a maximum, when the output angle is zero, in other words, on the normal line L5. The luminance of the output light is reduced as the output angle moves away from the normal line L5, and is significantly reduced when the angle is outside the specified angle range, in this case, the angle range of ±40 degrees. Thus, in this case, whether the diffracted light generated by the grooves 5d forms an image can be sufficiently determined, by determining whether the light within the angle range of 80 degrees (angle range of 40 degrees above and below the normal line L5) with respect to the normal line L5 of the first display surface 51 in the vertical direction, based on the intersection P of the first display surface 51 and the normal line L5 of the first display surface 51, among the rays of light output from the display 3, forms an image in the eye range ER.

FIG. 13, FIG. 14, and FIG. 15 are diagrammatic views for determining whether an image is formed in the eye range ER, under such conditions, by calculating the incident angle α and the output angle β using the formula (1) described above, when the groove pitch d is 1 μm, 0.5 μm, and 0.4 μm.

Here, it is assumed that m=1. In FIG. 13, FIG. 14, and FIG. 15, whether the diffracted light having visible light range components forms an image in the eye range ER is determined for the red light of the diffracted light having the wavelength λ of 650 nm, the green light of the diffracted light having the wavelength λ of 550 nm, and the blue light of the diffracted light having the wavelength λ of 450 nm. In FIG. 13, FIG. 14, and FIG. 15, line LB indicates the characteristics of the output angle β of the diffracted light, when the blue light enters the grooves 5d at the incident angle α. A line LG indicates the characteristics of the output angle β of the diffracted light, when the green light enters the grooves 5d at the incident angle α. A line LR indicates the characteristics of the output angle β of the diffracted light, when the red light enters the grooves 5d at the incident angle α. In FIG. 13, FIG. 14, and FIG. 15, a determination object region T is defined by the angle range [0 to α1=0 to 40 degrees] of the output light from the display 3, which is to be determined in the horizontal axis, and an angle range [β1 to β2=−10 to 10 degrees] of the eye range ER in the vertical axis. If the lines LR, LG, and LB do not pass through the determination object region T, it indicates that the diffracted light having the wavelength does not form an image at the viewing position in the eye range ER. In other words, a virtual image does not appear.

As illustrated in FIG. 13, if the groove pitch d is 1 μm (d=1 μm), all the lines LR, LG, and LB pass through the determination object region T. Thus, the diffracted light forms an image at the viewing position in the eye range ER, for all the red light, the green light, and the blue light. Consequently, a virtual image appears (corresponds to the state illustrated in FIG. 9). By contrast, as illustrated in FIG. 14, if the groove pitch d is 0.5 μm (d=0.5 μm), all the lines LR, LG, and LB are outside the determination object region T. Thus, the diffracted light does not form an image at the viewing position in the eye range ER, for all the red light, the green light, and the blue light. Consequently, a virtual image does not appear (corresponds to the state illustrated in FIG. 10). As illustrated in FIG. 15, if the groove pitch d is 0.4 μm (d=0.4 μm), the lines LR, LG, and LB move further away from the determination object region T, compared to that in FIG. 14. Thus, the diffracted light does not form an image at the viewing position in the eye range ER, for all the red light, the green light, and the blue light. Consequently, a virtual image does not appear. In this manner, under the conditions as described above, at least by making the groove pitch d of the fine grooves 5d equal to or less than 0.5 μm, the display device 1 can prevent the diffracted light from forming an image at the viewing position in the eye range ER, and also prevents a virtual image from appearing.

The display device 1 described above includes the first display surface 51 that outputs light and displays vehicle information, in this case, the first display surface 51 that displays the real images 51a related to vehicle information. The display device 1 also includes the second display surface 52 that is placed on top of the first display surface 51 in an overlapping manner, that transmits the light output from the first display surface 51, and on which the grooves 5d that form the real image drawing pattern 52a are created. The grooves 5d with the groove pitch d are created so as to prevent the diffracted light having visible light range components that is output from the first display surface 51 and that is diffracted by the grooves 5d from forming an image in the eye range ER, which is determined in advance according to a vehicle.

Thus, the display device 1 can display a combination of the real images 51a related to vehicle information displayed on the first display surface 51 and the real image drawing pattern 52a formed on the second display surface 52 that is placed on top of the first display surface 51 in an overlapping manner and that transmits the light output from the first display surface 51. In this case, because the grooves 5d that form the real image drawing pattern 52a on the second display surface 52 are created at a predetermined groove pitch d, the display device 1 can prevent the diffracted light having visible light range components that is output from the first display surface 51 and that is diffracted by the grooves 5d from forming an image in the eye range ER, which is determined in advance according to a vehicle. As a result, the display device 1 can prevent a virtual image of the real images 51a displayed on the first display surface 51 from being visually recognized from the viewing position in the eye range ER. Consequently, it is possible to ensure appropriate visibility. For example, when the second display surface 52 is in the non-display state, the display device 1 can prevent the real images 51a on the first display surface 51, which is at the rear surface side of the second display surface 52, from being blurred and difficult to see. Hence, the display device 1 can clearly transmit the real images 51a through the second display surface 52.

According to the display device 1 described above, the incident surface of the light to the first display surface 51 and the second display surface 52, and the exit surface of the light from the second display surface 52 are parallel to each other. The grooves 5d extend in the horizontal direction, and the groove pitch d is equal to or more than zero and equal to or less than 0.5 μm. Thus, the display device 1 prevents the diffracted light having visible light range components that is output from the first display surface 51 and that is diffracted by the grooves 5d from forming an image in the angle range of 20 degrees with respect to the normal line L5 of the first display surface 51 in the vertical direction, based on the intersection P of the first display surface 51 and the normal line L5 of the first display surface 51. More preferably, the minimum value of the groove pitch d corresponds to the producible size, for example, about 0.1 μm. Thus, under the conditions as described above, by creating the grooves 5d so that the groove pitch d is equal to or more than zero and equal to or less than 0.5 μm, the display device 1 can prevent the diffracted light having visible light range components that is output from the first display surface 51 and that is diffracted by the grooves 5d from forming an image in the angle range described above, typically, in the eye range ER, which is determined in advance according to a vehicle. Consequently, the display device 1 can effectively prevent a virtual image of the real images 51a displayed on the first display surface 51 from being visually recognized from the angle range described above, typically, from the viewing position in the eye range ER. Hence, it is possible to ensure appropriate visibility.

Also, according to the display device 1 described above, it is preferable that the groove pitch d is at a maximum in the range of a predetermined area in which the diffracted light having visible light range components that is output from the first display surface 51 and that is diffracted by the grooves 5d does not form an image. It is preferable that the groove pitch d is at a maximum in the angle range of 20 degrees with respect to the normal line L5 of the first display surface 51 in the vertical direction, based on the intersection P of the first display surface 51 and the normal line L5 of the first display surface 51, typically, in the eye range ER. Thus, if the groove pitch d prevents the diffracted light having visible light range components that is output from the first display surface 51 and that is diffracted by the grooves 5d from forming an image in a range determined in advance according to a vehicle, in this case, in the eye range ER, the amount of light reflected by the grooves 5d that form the real image drawing pattern 52a can be increased as much as possible, by increasing the size of the groove pitch d as much as possible, when the second display surface 52 is in the display state. As a result, the display device 1 can prevent a virtual image of the real images 51a displayed on the first display surface 51 from being visually recognized from the viewing position in the eye range ER. The display device 1 can also clearly display the real image drawing pattern 52a, when the second display surface 52 is in the display state. Thus, it is also possible to ensure appropriate visibility at this point. Furthermore, by increasing the size of the groove pitch d as much as possible, for example, the display device 1 can reduce the processing cost of the fine grooves 5d, thereby reducing the manufacturing cost.

Further, according to the display device 1 described above, the first display surface 51 displays vehicle information, in this case, the real images 51a related to vehicle information, by the light polarized in a single direction. The grooves 5d extend in the direction intersecting with the polarization direction L1 of the polarized light. Thus, the display device 1 can make the grooves 5d that form the real image drawing pattern 52a difficult to visually recognize when the second display surface 52 is in the non-display state, compared to that in the display state.

More specifically, the display device 1 described above includes the display 3 that has the image display surface 3a for emitting the light polarized in a single direction and displaying an image (real images 51a). The display device 1 also includes the superimposing display device 5 provided with the transparent light guide plate 5a and the light sources 5b. The transparent light guide plate 5a is placed on top of the image display surface 3a in an overlapping manner, transmits the light emitted from the display 3, and on which the grooves 5d that form the drawing pattern 5c (real image drawing pattern 52a) are created. The light sources 5b irradiate the end surface of the transparent light guide plate 5a with light. The superimposing display device 5 can switch the display state and non-display state of the drawing pattern 5c by turning on and turning off the light sources 5b. The polarization direction L1 of the display 3 and the extending direction L2 of the grooves 5d intersect with each other in the angle range from equal to or more than 75 degrees to equal to or less than 105 degrees. Thus, in the display device 1, the polarization direction L1 of the display 3 and the extending direction L2 of the grooves 5d intersect with each other in the angle range in which the luminance ratio of the luminance of the area of the drawing pattern 5c relative to the luminance of the area around the drawing pattern 5c on the transparent light guide plate 5a is equal to or more than 90% and equal to or less than 100%, when the light sources 5b are turned off and an image is displayed on the image display surface 3a. The transparent light guide plate 5a is configured so that the transmittance of the material of the area of the drawing pattern 5c is the same as that of the material of the area around the drawing pattern 5c.

Consequently, the display device 1 can achieve a wide variety of display modes by combining images (real images 51a) displayed on the image display surface 3a of the display 3 and the drawing pattern 5c (real image drawing pattern 52a) displayed on the transparent light guide plate 5a of the superimposing display device 5 placed on top of the image display surface 3a in an overlapping manner. In the display device 1, the polarization direction L1 of the display 3 and the extending direction L2 of the grooves 5d intersect with each other in a predetermined angle range. Thus, when the drawing pattern 5c on the transparent light guide plate 5a is not displayed, it is possible to relatively increase the luminance ratio of the luminance of the area of the drawing pattern 5c relative to the luminance of the area around the drawing pattern 5c on the transparent light guide plate 5a. Hence, when the light sources 5b are turned off and the drawing pattern 5c on the transparent light guide plate 5a formed by the fine grooves 5d is not displayed, the display device 1 can make the grooves 5d that form the drawing pattern 5c on the transparent light guide plate 5a difficult to visually recognize. Consequently, the display device 1 can prevent the visibility of an image displayed on the image display surface 3a of the display 3 from being blocked. As a result, for example, the display device 1 can ensure appropriate visibility while making it possible to display a wide variety of images.

In other words, in the display device 1, the design of the drawing pattern 5c can be displayed at the front surface side of the image display surface 3a of the display 3, and the image information on the image display surface 3a in the background and the design of the drawing pattern 5c can be three-dimensionally combined and displayed. Thus, for example, the display device 1 can display an innovative three-dimensional image. Further, the design of the drawing pattern 5c is difficult to see when the light sources 5b are turned off, in the superimposing display device 5 on which the drawing pattern 5c is formed by the fine grooves 5d. Hence, it is possible to see through the image display surface 3a in the background of the transparent light guide plate 5a, and the display device 1 can make the design of the drawing pattern 5c appear as necessary, when the light sources 5b are turned on.

According to the display device 1 described above, the polarization direction L1 of the display 3 and the extending direction L2 of the grooves 5d are orthogonal to each other. Thus, when the drawing pattern 5c on the transparent light guide plate 5a is not displayed, the display device 1 can make the luminance ratio of the area of the drawing pattern 5c relative to the area around the drawing pattern 5c to a maximum. Consequently, when the drawing pattern 5c on the transparent light guide plate 5a is not displayed, the display device 1 can effectively make the grooves 5d difficult to visually recognize. Also, the display device 1 can effectively prevent the visibility of an image displayed on the image display surface 3a of the display 3 from being blocked.

Further, according to the display device 1 described above, the extending direction L2 of the grooves 5d and the irradiation direction L3 of the light from the light sources 5b are orthogonal to each other. Thus, the display device 1 can make the light from the light sources 5b enter the grooves 5d that form the drawing pattern 5c in a substantially perpendicular manner. Consequently, the display device 1 can relatively increase the amount of light reflected by the grooves 5d to the front side (driver's seat side), when the drawing pattern 5c is displayed on the transparent light guide plate 5a. Thus, it is possible to clearly display the drawing pattern 5c.

Further, according to the display device 1 described above, the polarization direction L1 of the display 3 and the irradiation direction L3 of the light from the light sources 5b are in the vertical direction, and the extending direction L2 of the grooves 5d is in the horizontal direction. The length of the transparent light guide plate 5a in the horizontal direction is longer than that in the vertical direction, and the light sources 5b are arranged vertically below or vertically above the transparent light guide plate 5a. Thus, the display device 1 can further reduce its size by disposing the light sources 5b and the grooves 5d close to each other, making the extending direction L2 of the grooves 5d and the irradiation direction L3 of the light from the light sources 5b orthogonal to each other, and making the light from the light sources 5b enter the grooves 5d in a substantially perpendicular manner.

The display device according to the embodiment of the present invention described above is not limited to the embodiment described above, and various modifications may be made within the scope of the invention as defined by the appended claims.

In the above description, a single display 3 is used. However, two or more displays 3 may be combined and used.

In the display device 1 described above, the polarization direction L1 of the display 3 and the extending direction L2 of the grooves 5d intersect with each other in the angle range from equal to or more than 75 degrees to equal to or less than 105 degrees. In other words, the polarization direction L1 of the display 3 and the extending direction L2 of the grooves 5d may intersect with each other in the angle range so that the luminance ratio of the luminance of the area of the drawing pattern 5c relative to the luminance of the area around the drawing pattern 5c on the transparent light guide plate 5a is equal to or more than 90% and equal to or less than 100%. In the display device 1, for example, as long as the polarization direction L1 of the display 3 and the extending direction L2 of the grooves 5d have the relation as described above, the polarization direction L1 of the display 3 may tilt in the vertical direction.

In the above description, three light sources 5b are provided at a regular interval at a position vertically below the area where the drawing pattern 5c is formed, and that faces the end surface vertically below the transparent light guide plate 5a, along the width direction (horizontal direction). Each of the light sources 5b emits light vertically upward. However, it is not limited thereto, and the light sources 5b may be provided vertically above the transparent light guide plate 5a, or at the side of the transparent light guide plate 5a in the width direction.

In the above description, the grooves 5d extend in the horizontal direction. However, it is not limited thereto. For example, if the grooves 5d extend in the vertical direction, the light that enters the grooves 5d is diffracted along the horizontal direction, by the grooves 5d that extend in the vertical direction. In this case, whether the diffracted light generated by the grooves 5d forms an image may be determined, by assuming that a predetermine angle range along the horizontal direction is the eye range ER.

For example, the grooves 5d that form the drawing pattern 5c described above may be created on the principle surface on the front surface side of the transparent light guide plate 5a in the depth direction, and the principle surface on the front surface side of the transparent light guide plate 5a in the depth direction may form the second display surface 52.

In the display device 1 described above, as illustrated in FIG. 1, a reflecting material 57 may be provided on a predetermined portion of the end surface of the transparent light guide plate 5a, which is a member that forms the second display surface 52. Consequently, it is possible to further ensure appropriate visibility. More specifically, the reflecting material 57 is provided on the end surface of the transparent light guide plate 5a that forms the second display surface 52 and that faces the incident end surface toward which the light from the light sources 5b enters as well as the irradiation direction of the light. The reflecting material 57 is provided on the end surface vertically above the transparent light guide plate 5a, and that faces the light sources 5b in the vertical direction. The reflecting material 57 reflects the light from the light sources 5b to the side of the grooves 5d, which is a concave and convex portion. The reflecting material 57, for example, is made of a hot stamp foil, a mirror foil, and the like. However, it is not limited thereto, and the reflecting material 57 may be any material as long as the material reflects the light from the light sources 5b to the side of the grooves 5d. Consequently, the display device 1 can reflect the light from the light sources 5b to the side of the grooves 5d, using the reflecting material 57 provided on the end surface that faces the incident end surface of the transparent light guide plate 5a as well as the irradiation direction of the light. Hence, it is possible to relatively increase the amount of light reflected by the grooves 5d. As a result, the display device 1 can prevent the luminance of the real image drawing pattern 52a formed by the grooves 5d from being insufficient, and also can prevent the real image drawing pattern 52a from being difficult to visually recognize. Thus, it is possible to ensure appropriate visibility. In particular, in the display device 1, the real images 51a are also displayed on the first display surface 51 at the rear surface side of the second display surface 52, and the amount of light reflected by the fine grooves 5d tends to be relatively small, because the groove pitch d of the fine grooves 5d is equal or less than 0.5 μm. Consequently, the real image drawing pattern 52a displayed on the second display surface 52 in the display state tends to be difficult to see. However, by providing the reflecting material 57 in the display device 1 as described above, it is possible to relatively increase the amount of light reflected by the concave and convex portion (grooves 5d), when the second display surface 52 is in the display state. Thus, it is possible to ensure appropriate visibility even in such a configuration. Also, the display device 1 can prevent luminance unevenness of the real image drawing pattern 52a by the action of the reflecting material 57. Thus, it is further possible to ensure appropriate visibility at this point.

Figure 16:
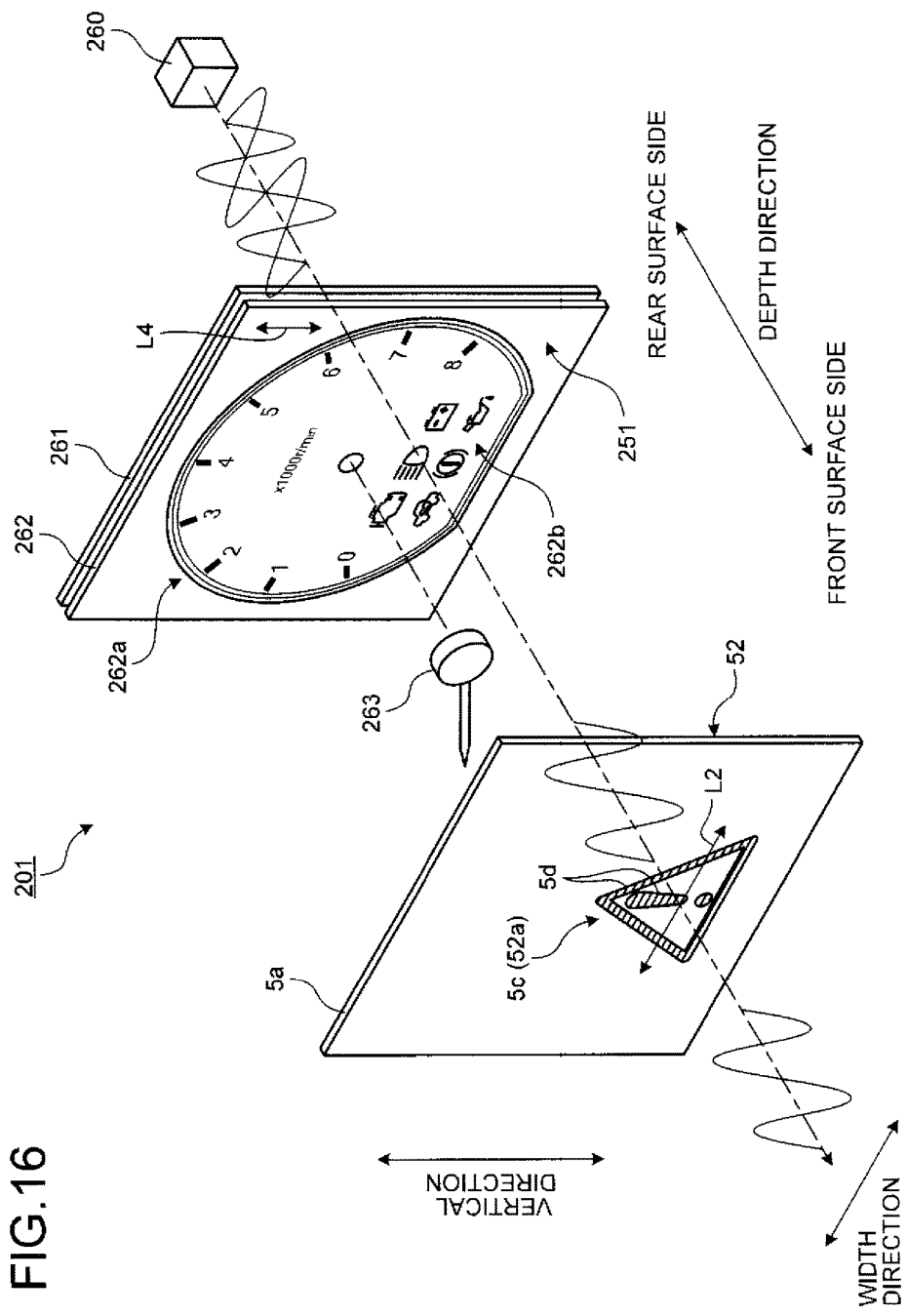
FIG. 16 is an exploded perspective view schematically illustrating a configuration of a display device according to a modification.

In the above description, the first display surface 51 displays the real images 51a related to vehicle information, as the vehicle information, by the light polarized in a single direction. However, it is not limited thereto, and the vehicle information may be displayed apart from the real images 51a. A display device 201 according to a modification illustrated in FIG. 16 includes a first display surface 251 that has an analog instrument and the surface of the dial plate (surface on the front surface side in the depth direction). In this case, the display device 201 typically has a structure in which a rear surface side light source 260, a polarization plate 261, a dial plate 262, a pointer 263, and the transparent light guide plate 5a of the superimposing display device 5 are layered in this order, from the rear surface side toward the front surface side in the depth direction. In the example in FIG. 16, the drawing pattern 5c (real image drawing pattern 52a) formed by the fine grooves 5d, for example, is a "caution sign (icon shaped like an exclamation mark in a triangle)", and the extending direction L2 of the grooves 5d is in the horizontal direction. The second display surface 52 is configured with the principle surface on the rear surface side of the transparent light guide plate 5a in the depth direction, on which the grooves 5d that form the drawing pattern 5c are created.

The rear surface side light source 260, the dial plate 262, and the pointer 263 configure an analog instrument (here, a tachometer is used as an example, but it is not limited thereto) that displays various measurement values related to the vehicle by using the pointer 263 in an analog manner. The rear surface side light source 260 is provided in the casing 2 (see FIG. 1 and the like) and emits light from the rear surface side toward the front surface side in the depth direction. Here, a single rear surface side light source 260 is illustrated. However, a plurality of rear surface side light sources 260 may be used. For example, the rear surface side light source 260 is configured with an LED element and the like, but it is not limited thereto.

The dial plate 262 is a plate-like member with various drawing patterns, symbols, character strings, and the like corresponding to the vehicle information to be displayed. The dial plate 262 is substantially in a rectangular shape, and is provided on the front surface side of the rear surface side light source 260 in the depth direction. For example, the dial plate 262 is a transparent material such as a polycarbonate sheet, and the shapes corresponding to the drawing patterns, symbols, character stings, and the like described above, the inside of which is hollowed out, are printed on the dial plate 262 using dark ink. Light is emitted toward the dial plate 262 from the rear surface side light source 260, and when the emitted light transmits through the portion with the drawing patterns, the symbols, the character strings, and the like, those drawing patterns, symbols, character strings, and the like are lit and displayed. For example, an index unit 262*a* and a notification symbol 262*b* are formed on the dial plate 262, as the drawing patterns, the symbols, and the character strings related to vehicle information. On the dial plate 262, the portions of the index unit 262*a* and various notification symbols 262*b* are the portions the inside of which is hollowed out as described above, in other words, the portions that transmit light. The index unit 262*a* transmits the light emitted from the rear surface side light source 260, and is pointed out by the pointer 263. Each index unit 262*a* includes an arc along the rotational locus of the tip end of the pointer 263, a plurality of scales marked along the arc at a regular interval, numerals, and the like. The notification symbols 262*b* include what are called various warning lamps (what are called telltales) that light up corresponding to an event that the driver or the like needs to be warned. Each of the notification symbols 262*b* transmits the light emitted from the rear surface side light source 260, and can switch the display state and non-display state by turning on and turning off the rear surface side light source 260. The pointer 263 is placed on the front surface side of the dial plate 262 in the depth direction, and rotates when a motor provided in the casing 2 (see FIG. 1 and the like) is driven.

The pointer 263 points out a predetermined position of the index unit 262*a* corresponding to various measurement values (such as vehicle speed and rotation speed) related to the vehicle.

The first display surface 251 of the present modification is a display surface that displays vehicle information, by transmitting the light emitted from the rear surface side light source 260 in a predetermined shape. The first display surface 251 is the surface at the front side of the dial plate 262 in the depth direction that includes the index unit 262*a*, the notification symbol 262*b*, and the like.

The polarization plate 261 is provided between the rear surface side light source 260 and the second display surface 52 of the transparent light guide plate 5*a*, and polarizes the light emitted from the rear surface side light source 260 to the second display surface 52 in a single direction. The polarization plate 261 is substantially in a rectangular shape, and provided on the surface at the rear surface side of the dial plate 262 in the depth direction. However, the polarization plate 261 may also be provided on the surface on the front surface side of the dial plate 262 in the depth direction, or on the surface at the rear surface side of the transparent light guide plate 5*a* in the depth direction. The polarization plate 261 aligns the light emitted from the rear surface side light source 260 in a polarization direction L4 (see FIG. 16 and the like) as the transmission axis direction, and outputs the light in the vibration direction along the polarization direction L4 (transmission axis direction). Thus, the light polarized in a single direction is output to the side of the second display surface 52. The polarization direction L4 of the light polarized by the polarization plate 261 is the vertical direction. In other words, the extending direction L2 of the grooves 5*d* and the polarization direction L4 by the polarization plate 261 are orthogonal to each other. Even in this case, because the grooves 5*d* extend in the direction intersecting with the polarization direction L4, the display device 1 can make the grooves 5*d* that form the real image drawing pattern 52*a* difficult to see, when the second display surface 52 is in the non-display state. Further, the display device 1 can prevent a virtual image of the real images 51*a* displayed on the first display surface 51 from being visually recognized from the viewing position in the eye range ER. Thus, it is possible to ensure appropriate visibility.

The display device according to the present invention can display a combination of an image related to vehicle information displayed on the first display surface and a drawing pattern formed on the second display surface that is placed on top of the first display surface in an overlapping manner and that transmits the light output from the first display surface. In this case, because a plurality of grooves that form the drawing pattern on the second display surface are created at a predetermined groove pitch, the display device can prevent the diffracted light having visible light range components that is output from the first display surface and that is diffracted by the grooves from forming an image in the eye range, which is determined in advance according to a vehicle. As a result, the display device can prevent a virtual image of an image displayed on the first display surface from being visually recognized from the viewing position in the eye range. Thus, it is possible to ensure appropriate visibility.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
    a first display surface that emits light and displays vehicle information; and
    a second display surface that is placed on the first display surface in an overlapping manner, transmits the light emitted from the first display surface, and on which grooves that form a drawing pattern are created, wherein
    the grooves with a groove pitch are created so as to prevent diffracted light having a visible light range component that is emitted from the first display surface and that is diffracted by the grooves from forming an image in an eye range determined in advance according to a vehicle.
2. The display device according to claim 1, wherein
    the groove pitch is at a maximum within a range of a predetermined area in which the diffracted light having a visible light range component that is emitted from the first display surface and that is diffracted by the grooves does not form an image.

3. The display device according to claim 1, wherein
the first display surface displays the vehicle information by light polarized in a single direction, and
the grooves extend in a direction intersecting with a polarization direction of the light being polarized.

4. The display device according to claim 2, wherein
the first display surface displays the vehicle information by light polarized in a single direction, and
the grooves extend in a direction intersecting with a polarization direction of the light being polarized.

5. The display device according to claim 1, further comprising:
a light source that selectively emits light to be incident on an end surface that extends away from the second display surface, at least a part of the light incident on the end surface is then reflected by the grooves to illuminate the drawing pattern formed by the grooves such that the drawing pattern is selectively superimposed on the vehicle information displayed by the first display surface.

6. A display device comprising:
a first display surface that emits light and displays an image related to vehicle information; and
a second display surface that is placed on the first display surface in an overlapping manner, transmits the light emitted from the first display surface, and on which grooves that form a drawing pattern is created, wherein an incident surface of light to the first display surface and the second display surface, and an exit surface of light from the second display surface are parallel to each other, and
the grooves extend in a horizontal direction and prevent diffracted light having a visible light range component that is emitted from the first display surface and that is diffracted by the grooves from forming an image within an angle range of 20 degrees with respect to a normal line of the first display surface in a vertical direction, based on an intersection between the first display surface and the normal line of the first display surface, by making a groove pitch equal to or more than zero and equal to or less than 0.5 μm.

7. The display device according to claim 6, wherein
the groove pitch is at a maximum within a range of a predetermined area in which the diffracted light having a visible light range component that is emitted from the first display surface and that is diffracted by the grooves does not form an image.

8. The display device according to claim 6, wherein
the first display surface displays the vehicle information by light polarized in a single direction, and
the grooves extend in a direction intersecting with a polarization direction of the light being polarized.

9. The display device according to claim 7, wherein
the first display surface displays the vehicle information by light polarized in a single direction, and
the grooves extend in a direction intersecting with a polarization direction of the light being polarized.

* * * * *